June 7, 1966  L. T. RANKIN  3,254,756
SAFETY KIT
Filed Sept. 3, 1963
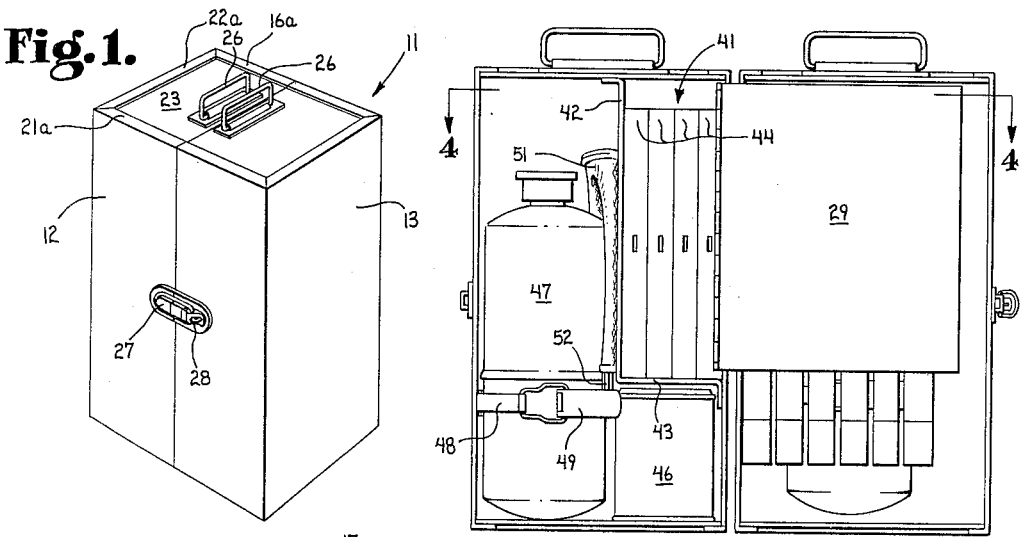
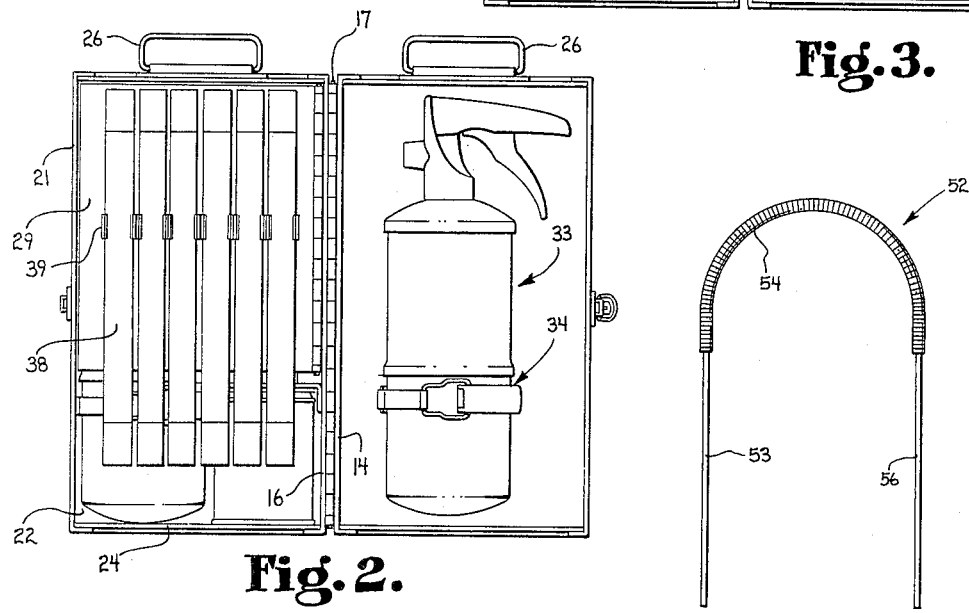
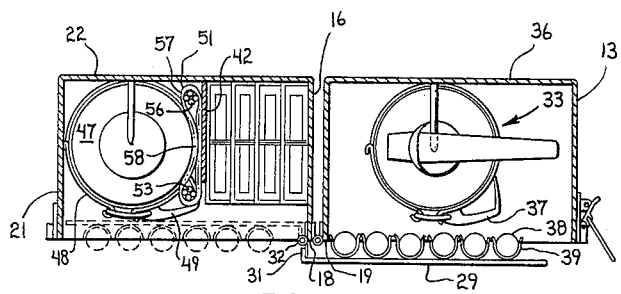
INVENTOR.
Lindel T. Rankin
BY
Lockwood, Woodard, Smith & Weikart
Attorneys

United States Patent Office 3,254,756
Patented June 7, 1966

3,254,756
SAFETY KIT
Lindel T. Rankin, 2803 Allen Ave.,
Indianapolis 3, Ind.
Filed Sept. 3, 1963, Ser. No. 306,235
4 Claims. (Cl. 206—1)

This invention relates generally to safety apparatus and more particularly to safety equipment carried by a truck or other vehicle for use in various types of emergencies.

Various laws and regulations affecting the operation of motor trucks require that the trucks be equipped with various items of safety equipment. Examples of such items are fire extinguishers, fusees, reflector flares, and flags.

Most trucks do not have any specific location or provision for these various items of safety equipment. Consequently, there is a tendency to neglect to keep in the truck the required items of safety equipment. Furthermore, when it is necessary to use them or to show them to an Interstate Commerce Commission inspector, it may be impossible to locate them either because they are misplaced on the vehicle or are not present. Furthermore, it is difficult for even the careful truck drivers to maintain an inventory of the various items because there is no one place where they can all be kept. Furthermore, there is no satisfactory way to avoid theft of these items such as occasionally occurs at truck stops along the highway.

The results of the aforementioned present practice include failure to employ or have available proper equipment in the case of emergencies, fines for violations of Interstate Commerce Commission regulations, excessive cost to truck operators, and inconvenience.

It is, therefore, a general object of the present invention to provide means for safer and more satisfactory operations by vehicle operators and particularly fleet operators such as trucking companies.

A further object is to provide means facilitating the maintenance of a proper and complete inventory of necessary and desirable safety equipment items.

A further object is to provide means whereby a vehicle driver or other designated person can maintain control of a set of safety equipment at all times.

A further object is to provide means whereby safety equipment items can be conveniently locked to a vehicle.

The full nature of the invention will be understood from the accompanying drawings and the following description and claims.

FIG. 1 is a perspective view of a typical embodiment of the safety kit of the present invention in the closed condition.

FIG. 2 is a front elevational view of the kit in opened condition.

FIG. 3 is a front elevational view thereof with a portion of the kit disposed in an alternate position to illustrate the disposition of the fire extinguisher and fusees.

FIG. 4 is a section taken along the line 4—4 in FIG. 3 and viewed in the direction of the arrows.

FIG. 5 is an enlarged view of a portion of one of the elements of the kit.

Referring to the drawings in detail, the kit includes a case 11 which is generally rectangular in form, though other shapes may also be devised. The case includes first and second portions 12 and 13 which may be identical in construction, the portion 13 having a wall 14 juxtaposed with the wall 16 of the portion 12. A suitable hinge 17 joins these walls at the marginal edges 18 and 19 thereof. The two portions of the case can therefor be swung from the closed condition shown in FIG. 1 to the open position shown in FIGS. 2, 3, and 4.

Typical construction of the case employs 16 gage steel sheet which is formed into three walls of each portion of the case. For example, for the left-hand portion 12, the walls 21, 22, and 16 are formed from a single sheet of steel with the upper end 23 spot welded to the flanges 21a, 22a, and 16a which are inwardly turned from each of the walls 21, 22, and 16 respectively. The lower end plate 24 is secured to inturned flanges at the lower marginal edges of the three walls, in like manner. The right-hand portion 13 is constructed in the same way. Handles 26 are secured to the upper ends of the left and right-hand portions of the case to facilitate carrying. A trunk latch 27 is employed to secure the two portions of the case together in the closed condition as shown in FIG. 1. A suitable eye 28 is provided in the latch through which the shackle of the padlock can be passed. This provision facilitates not only locking the case closed but also locking it to a chain or other attachment to a vehicle to prevent theft of the kit or any of its contents from the vehicle.

A swingable panel 29 is provide in the case. This panel is made of a sheet of steel having an inwardly turned flange 31 which is spot welded to the hinge 32 which is, in turn, spot welded to the inside face of the wall 16 of the left-hand portion of the case, immediately adjacent the marginal edge 18 thereof. When the case is open, the panel is swingable from the position shown in FIG. 2 and designated by the dotted outline in FIG. 4, to the position shown in FIG. 3 and shown by the solid outline in FIG. 4.

A fire extinguisher 33 is employed in the kit and is mounted by means of the quick release band assembly 34. The band assembly is mounted to the rear wall 36 of the right-hand portion 13 of the case. This may be accomplished by spot welding or riveting. By simply pulling the handle 37 the band may be separated and the fire extinguisher removed. The fire extinguisher which is typically employed is a 2½ pound dry type fire extinguisher, through other sizes and types may also be employed.

With the panel 29 disposed in the position shown in FIG 2, the mounting of six fusees 38 can be observed. Spring clips 39 which are generally U-shaped as viewed in FIG. 4, can be spot welded or riveted to the panel 29. These receive the fusees. The preferred type of fusees are those with the foldable wire strands, although the type employing a spike in the lower end can also be incorporated.

A flare compartment 41 is provided in the left-hand portion of the case being formed by the wall 42 and floor 43 co-operating with a portion of the upper end and inner wall of the left-hand portion of the case. The wall 42 and floor 43 are formed of a single sheet of steel flanged at both ends and spot welded at the junction of the flanges with the upper end and inner wall 23 and 16 respectively of the case portion 12. The flare compartment 41 receives four standard, Underwriters approved reflector type flares 44. By simply swinging the panel 29 to the position shown in FIG. 3, these flares are readily accessible.

Below the flare compartment, a first aid kit space is provided in which there is disposed the first aid kit 46.

To the left of the flare compartment and first aid kit compartment, there is mounted an extra cartridge 47 for the fire extinguisher 33. This extra cartridge is mounted by the quick release band 48 which is welded or riveted to the rear wall 22 of the portion 12 of the case. By simply pulling the handle 49, the cartridge can be readily removed to replace the cartridge on the extinguisher 33 when it has become exhausted.

The spare cartridge is disposed in close proximity to the wall 42 of the flare compartment. A set 51 of four red flags having flexible staffs 52, of the type shown in FIG. 5, is disposed between the replacement cartridge 47 and the wall 42. Each of the staffs 52 as shown in FIG. 5 has a straight wire 53 at one end of a flexible portion 54 and a straight wire 56 at the other end of the flexible portion. The staff is placed in the U-shape as shown in FIG. 5 whereupon the flags are wound around to maintain the staffs in the U-shape. The assembly is then placed in position between the spare cartridge 47 and the wall 42 whereupon the portions 56 of the staffs cause a bulge at the area 57 which holds the flags in position even though the natural tendency of the staffs is to straighten. Consequently, so long as the flags are disposed as shown in FIG. 4 in the case, they will remain securely wrapped together and will not become disassembled or unfolded unless intentionally removed from the case.

As shown in FIG. 4, the close proximity at the point 58 between the wall 42 and the wall of the spare cartridge 47 holds together the portions of the flags spanning between the staff portions 53 and 56 and prevents unraveling or unwinding of the flags from the position shown. The flags are the usual square or rectangular red flags which are well known and readily available.

From the foregoing description, it should be readily apparent that the present invention is well suited to overcoming the disadvantages of the present practices and to achievement of the objects set out herein. It is also capable of providing other advantages which have not been specifically mentioned but which will become apparent to manufacturers and users. It is not only quite desirable for operators of truck fleets, but also for operators of other types of fleets, such as taxi cabs, buses, and rental vehicles. It is also desirable for operators or individual privately owned pleasure cars and will find many other applications in addition to these mentioned for vehicles.

It will occur to those skilled in the art that variations are possible within the scope of the present invention and is intended that the scope be not limited to those applications specifically mentioned herein.

Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A safety kit comprising: first and second housing portions, each hingedly connected to the other along juxtaposed margin edges thereof; a fire extinguisher disposed in one of said portions; reflector flares and a first aid kit disposed in the other of said portions; and a panel hingedly attached to one of said portions and swingable, when said portions are in an open condition, to positions alternately exposing said fire extinguisher and said reflector flares, and fusees removably attached to said panel and swingable therewith.

2. A safety kit comprising: a case having first and second housing portions pivotally attached to each other whereby said portions are swingable from a first condition forming a closed case to a second condition opening said case; a wall disposed in one of said portions; a fire extinguisher cartridge disposed in said one of said portions and having an external surface immediately adjacent the wall in said portion; and flag means disposed between said fire extinguisher cartridge surface and said wall and retained in position by said fire extinguisher and said wall.

3. A safety kit comprising: first and second housing portions pivotally attached to each other and swingable together to form a closed housing; handle means disposed on one of said portions to facilitate carrying said housing; latch means on each of said housing portions and mutually engageable to lock said housing portions in a closed condition, said latch means including lock means adapted to receive a padlock shackle for simultaneously locking said housing in closed condition and locking said housing to an anchor structure; a fire extinguisher disposed in said first housing portion; a compartment forming partition in said second housing portion, said compartment forming partition having a floor member adjoined thereto and joining a wall of said second portion and forming a compartment in said second portion; reflector flares disposed in said compartment; a fire extinguisher cartridge disposed immediately adjacent said partition and outside of said compartment; flag means disposed between said partition and said fire extinguisher cartridge and secured therebetween by said fire extinguisher cartridge; a swingable panel hingedly mounted to one of said portions for swinging thereon; fusees mounted to said swingable panel; and a first aid kit disposed in said second portion below said reflector flare compartment and adjacent said fire extinguisher cartridge.

4. The safety kit as set forth in claim 3 wherein said flag means includes flexible, substantially non-yielding material and flexible staff means, with said material being wrapped around said staff means to maintain said staff means in a generally U-shaped condition.

References Cited by the Examiner

UNITED STATES PATENTS

| | | | |
|---|---|---|---|
| 1,147,077 | 7/1915 | Collier | 312—200 |
| 1,239,023 | 9/1917 | McElhinny | 206—16 |
| 1,314,915 | 9/1919 | Trullench | 206—16 |
| 2,501,270 | 3/1950 | Fleming | 312—200 X |
| 2,622,729 | 12/1952 | Uttz | 206—16 |
| 2,650,449 | 9/1953 | Suring | 206—16 X |
| 2,685,636 | 8/1954 | Falk | 206—16 |
| 3,113,817 | 12/1963 | Imel | 312—199 |
| 3,133,631 | 5/1964 | Bolden | 206—16 |

LOUIS G. MANCENE, *Primary Examiner.*

THERON E. CONDON, *Examiner.*